United States Patent [19]

Vanderputten et al.

[11] 4,400,219
[45] Aug. 23, 1983

[54] PLANT FOR CONTINUOUSLY PREPARING STARCH GLUE

[75] Inventors: Robert Vanderputten, Geraardsbergen; Oscar Vandewalle, Affligem; Julien Van Den Broeke, Nieuwerkerken, all of Belgium

[73] Assignee: "Graanderivatan Raffinaderijen Amylum,"in het kort: "G.R. Amylum," vroeger "Glucoseries reunies" genoemd, Brussels, Belgium

[21] Appl. No.: 306,728

[22] Filed: Sep. 29, 1981

[30] Foreign Application Priority Data

Oct. 31, 1980 [BE] Belgium .............................. 2/58831

[51] Int. Cl.³ .......................... C13L 1/08; C08L 3/00
[52] U.S. Cl. ...................................... 127/23; 106/213; 127/71; 366/290; 366/293; 366/307; 422/134; 422/135; 422/194
[58] Field of Search ........................... 127/23, 70, 71; 422/193, 194, 195, 134, 135; 366/290, 295, 293, 307, 316, 317; 106/213

[56] References Cited

U.S. PATENT DOCUMENTS

| | | | |
|---|---|---|---|
| 2,918,264 | 12/1959 | Ackles | 366/317 |
| 3,194,638 | 7/1965 | Neuville | 366/290 |
| 3,245,762 | 4/1966 | Ullrich | 422/134 |
| 3,321,283 | 5/1967 | Ewald | 366/290 |
| 3,494,412 | 2/1970 | Abraham | 366/290 |
| 3,622,388 | 11/1971 | Larson | 127/23 |
| 3,950,138 | 4/1976 | Wolf | 422/135 |

FOREIGN PATENT DOCUMENTS 809123 4/1974 Belgium .

Primary Examiner—Kenneth M. Schor
Attorney, Agent, or Firm—Stevens, Davis, Miller & Mosher

[57] ABSTRACT

The plant comprises a single reactor divided into adjacent cells which communicate together with a limited passage opening. An inlet for a primary starch fraction and an inlet for a starch-reducing product open into one end-cell, an outlet for the glue connects to the other end-cell and an inlet for a secondary starch fraction opens into an intermediate cell. In this intermediate cell a baffle-plate is mounted. A stirrer is mounted in the reactor and comprises in each cell a stirring disc extending eccentrically relative to the geometrical reactor axis.

7 Claims, 5 Drawing Figures

PLANT FOR CONTINUOUSLY PREPARING STARCH GLUE

BACKGROUND

The invention relates to a plant for continuously preparing starch glue by gelatinizing a primary starch fraction and mixing the resulting carrier with a secondary fraction from ungelatinized starch, which plant comprises a reactor which is divided by partitions into adjacent cells having each a cylindrical inner wall, which cells communicate together with a limited passage opening, a stirrer arranged inside the reactor with a shaft extending through the passage openings and a stirring disc mounted inside each cell on, said shaft and a drive mechanism for said stirrer, which reactor comprises an inlet for the primary starch fraction and an inlet for a product for gelatinizing said primary starch fraction, which inlets open in a cell lying at the one reactor end, an outlet for the glue which outlet connects to the cell lying at the other reactor end, and an inlet for the secondary fraction which inlet opens in an intermediate-lying cell.

Known plants for continuously preparing starch glue or paste, among others in the corrugated cardboard industry, comprise two discrete mixing volumes, namely a first mixing volume wherein a starch suspension is mixed with caustic soda, whereby gelatinization occurs and the carrier is formed, and a second mixing volume wherein said carrier is mixed with a suspension from native starch and borax, whereby the glue or paste is formed. Both mixing volumes are each fitted with a separate stirrer driven at a different speed.

When preparing the carrier, use is always made of a relatively low stirring speed, generally but 1500 r.p.m. With a higher speed there always appears a temperature increase resulting from mechanical shearing forces, whereby the temperature inside the mixing volume may rise up to 60°. Such a high temperature results when contacting the primary starch fraction with the secondary starch fraction inside the second mixing volume, in an additional gelatinization of said secondary starch fraction. In the primary starch fraction or carrier an excess sodium hydroxide is always present which can cause gelatinization in the native starch, at the above mentioned high-temperature. Such additional gelatinization of the secondary fraction results in a premature gelatinization of the glue and is thus undesirable.

When mixing the carrier and the secondary starch fraction inside the second mixing volume to the contrary, the abovementioned relatively low stirring speed, for example 1500 r.p.m., is not high enough to obtain a homogeneous mixing. Use is then generally made also of a speed of 3000 r.p.m.

It is indeed due generally to the requirement for a different mixing speed that the known plants comprise at least two discrete mixing vats.

Both mixing volumes are generally open vats with a relatively large content, namely between 100 and 500 liters. The mixing occurs thus at atmospheric pressure. The content, the shape and the equipment of the first mixing vat are so chosen that the sodium hydroxide and the starch remain long enough in contact together with a high enough concentration and at a determined temperature for the gelatinizing of the starch and the homogenizing, while the volume of the second mixing vat is so selected that an optimum homogenizing and stabilizing is possible.

Said known plants do not only have the drawback of being relatively voluminous due to the requirement for two relatively large mixing vats, but such plants also are not very flexible. Such plants require relatively much time to provide usable glue after starting the mixing. Moreover, inside each mixing vat is present a relatively large amount of product, in such a way that should the plant have a failure, relatively a lot of product will be lost.

To obviate already somewhat the above-mentioned drawbacks and mostly to increase the production capacity, there have been designed plants which comprise more than two mixing vats and generally have four mixing vats. Such mixing vats are arranged in series, they have a relatively small content, generally but 2.5 liters, and they are completely closed. Inside a first mixing chamber, the starch suspension is by means of caustic soda. The homogenizing and stabilizing of the thus resulting carrier occurs inside a second mixing chamber. Inside a third mixing chamber, the homogenized and stabilized carrier is contacted with the secondary starch fraction. To obtain a stable glue or paste, the resulting mixture should further be stirred, which occurs inside a fourth mixing chamber and according to the throughput of the plant, possibly also inside following chambers.

Such a plant with four or more closed mixing chambers is naturally relatively intricate and expensive, notably due to each such mixing chambers having its own stirrer and own driving mechanism therefor. The stirring speed when preparing the carrier is always different from the stirring speed when mixing the carrier and the secondary starch fractions and thus preparing the glue, which makes any automatizing rather delicate.

In Belgian Patent No. 809.123 in the Applicant's name, which pertains to such plants, it is actually mentioned that two or four mixing vats may be replaced by a multi-cell reactor, but with the multicellular reactors known up to now, no glue with satisfactory properties could be obtained. In such a multi-cell reactor, the stirring in all of the cells occurs with the same speed, while actually the carrier preparation and the glue preparation should occur with a different stirring speed.

The invention has now for object to obviate all said drawbacks and to provide a plant for continuously preparing starch glue of good quality, in which plant the mixing vats are replaced by a compact multicellular reactor of simple structure.

THE INVENTION

For this purpose, the stirring discs from the stirrer lie off center relative to the reactor, and said reactor comprises at least in that cell the inlet for the secondary starch fraction connects to, at least one baffle-plate.

It did in fact appear surprisingly that due to such structural arrangements in a multicellular mixing reactor, it was possible to obtain even with one and the same stirring speed in all the cells, good results.

In a particular embodiment of the invention, that cell the secondary starch fraction is fed to, that cell the glue outlet opens on, and all the cells lying between said cells are provided with at least one baffle-plate.

In a remarkable embodiment of the invention, the inlet for the primary starch fraction, the inlet for the gelatinizing products, and the inlet for the secondary starch fraction connect to the corresponding reactor cell at the level of the stirring disc arranged inside said cell.

In a preferred embodiment of the invention, the passage openings have a size of 100 cm² at the most for a glue output of 4.500 liters per hour at the most.

In a particularly useful embodiment of the invention, the cells are round inside and the shaft which the stirring discs are mounted on, has a geometrical axis lying at a distance of the geometrical axis of the reactor of about 1/25 the cell inner diameter.

DESCRIPTION OF THE PREFERRED EMBODIMENT

Other details and advantages of the invention will stand out from the following description of a plant for continuously preparing starch glue or paste according to the invention; this description is only given by way of example and does not limit the invention; the reference numerals pertain to the accompanying drawings.

DRAWINGS

In the various figures, the same reference numerals pertain to the same elements.

Figure 1:
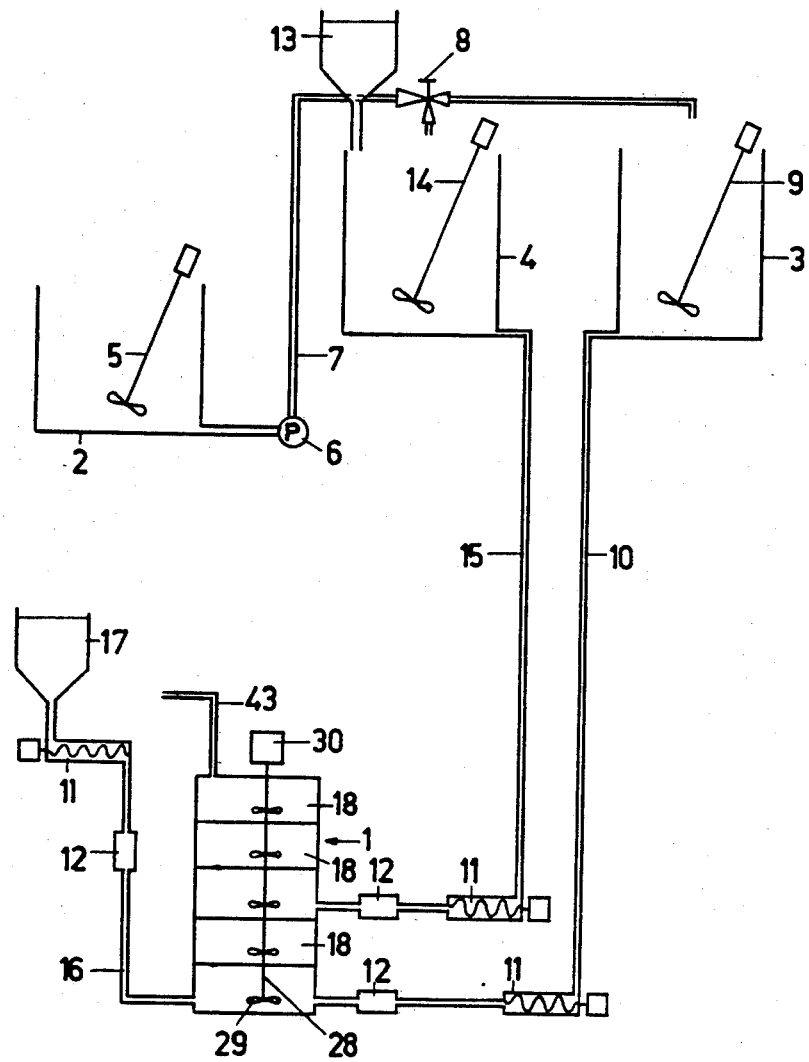
FIG. 1 shows a block diagram for a plant for continuously preparing starch glue according to the invention.

The plant for continuously preparing starch glue or paste as shown in the figures mainly comprises a plant for preparing a primary starch fraction, which fraction is formed by starch in solution in water, and for preparing a secondary starch fraction which fraction is comprised of a solution from starch in water to which borax has been added, and a mixing reactor 1 inside which the primary starch fraction is first gelatinized and then mixed with the secondary starch fraction to form the starch glue.

The plant for preparing the primary and secondary starch fractions has a structure known per se and is only sketchily described hereinafter as far as required to make the invention clear. Said plant may thus be comprised of a mixing vat 2 for the primary starch fraction, a storage tank 3 for said primary starch fraction, and a mixing vat 4 for the secondary starch fraction. To said mixing vat 2 are fed water at approximately 35° C. and starch. Said water and starch are mixed by a stirrer 5. By means of a pump 6, a portion from the thus-prepared starch solution is pumped through a line 7 and a three-way valve 8, to the storage tank 3 wherein said solution is kept homogeneous by means of a stirrer 9. Said solution then forms the primary starch fraction which is fed through line 10 from storage tank 3 to reactor 1. In said line 10 are mounted a metering pump 11 and a flow-meter 12.

Another portion from the primary starch fraction prepared inside mixing vat 2 is fed in another position of said three-way valve 8 and through line 7, to the mixing vat 4. To said mixing vat 4 is fed from tank 13, a quantity of borax which is mixed with the added starch fraction by means of a stirrer 14. In this way there is obtained the secondary starch fraction which is also fed, through line 15, to reactor 1. In line 15 as in line 10, are mounted a metering pump 11 and a flow-meter 12.

To reactor 1 further connects a feed line 16 for caustic soda. In said line 6 are also mounted a metering pump 11 and a flow-meter 12. Said line 16 connects to a storage tank 17 for a sodium hydroxide solution.

A feature of the invention lies in the gelatinization of the primary starch fraction to form a carrier and the following mixing of said carrier with the secondary starch fraction inside one and the same reactor 1, which is possibly due to the unique structure of said reactor.

As it appears from FIGS. 2 to 5, said reactor 1 is comprised of five cells 18 arranged on top of one another.

Said cells 18 are formed by pieces of round steel pipe 19 which are provided at both ends thereof with an outwardly-directed flange, and by end walls 20 or partitions 21 which close off the ends from said tube pieces 19. At each end of reactor 1 is thus arranged an end wall 20 which is made fast by means of bolts 22 and nuts 23, to the flanges from the outermost tube pieces 19 of reactor 1. A partition 21 is present between the adjacent flanges of adjacent tube pieces 19. Said partitions 21 are secured by the bolts 22 and nuts 23 said adjacent flanges are made fast together with. Between each wall or partition 20 or 21 and that flange it is fastened against, is further arranged a sealing ring 24. There is obtained in this way a reactor 1 which is dismantable in such a way that the tube pieces 19, the walls 20 and 21 or the sealing rings 24 are easy to replace. It is also possible by adding tube pieces 19 and partitions 21, to increase the number of cells 18, in the reactor 1 as this appears to be required. To be able to clean every cell 18 without having to disassemble the reactor 1 therefore each tube piece 19 is provided with a trap-door 25 which can be swung open to clean the cell 18 but which is, when reactor 1 is operating, locked in a closed position by means of a locking mechanism known per se, not shown in the figures.

The walls and partitions 20 and 21 have a thickness of substantially 10 mm. The inner height of each cell 18 is about 100 mm and the inner diameter thereof is about 260 mm. The inner diameter of each cell 18 is thus about 2.5 times the height thereof.

The outermost cells 18 of the reactor are connected to a frame 27 by means of supports 26.

The reactor 1 further comprises a stirrer which comprises a center shaft 28 and inside each cell 18, a stirring disc 29 which is mounted on said shaft 28. The shaft 28 has a diameter of 35 mm and its geometrical axis is at a distance of 1 cm from the lengthwise axis of reactor 1. The shaft is driven by an electric motor 30 with 15 kW power rotating at 1500 r.p.m. Said motor 30 is mounted on frame 27 at the uppermost end of reactor 1. The shaft 28 is supported in bearings 31 which are mounted on the walls 20 at both ends of reactor 1. Said shaft 28 thus passes through a suitable opening 32 in the uppermost wall 20 of the uppermost cell 18, and in the lowermost wall 20 of the lowermost cell 18, as well as through openings 33 a suitable opening in the partitions 21 between adjacent cells 18. Inside opening 32 lying somewhat off center in a wall 20, said shaft 28 is surrounded by a sealing 34. The openings 33 in the other partitions 21 lie in the center but have a diameter which is markedly larger than the diameter of shaft 28 while still being limited in size, namely equal at the most to 65 mm for a glue output of 4500 liters per hour at the most. Such an opening 33 thus forms about shaft 28 a widening-narrowing ring the maximum width of which is 25 mm. That portion of said opening 33 lying around the shaft 28, thus forms a limited passage opening of 100 cm$^2$ at the most through which the product can flow in the normal flow direction through reactor 1, that is from bottom to top, from the one cell 18 to a cell 18 lying thereabove.

The ratio between the inner diameter of a cell 18 and the diameter of a theoretical circle circumscribing the stirring disc 29 lying therein is about 26 to 22. As the inner diameter of a cell 18 is equal to 260 mm, the theoretical circle circumscribing stirring discs thus have a diameter of 220 mm.

Figure 2:
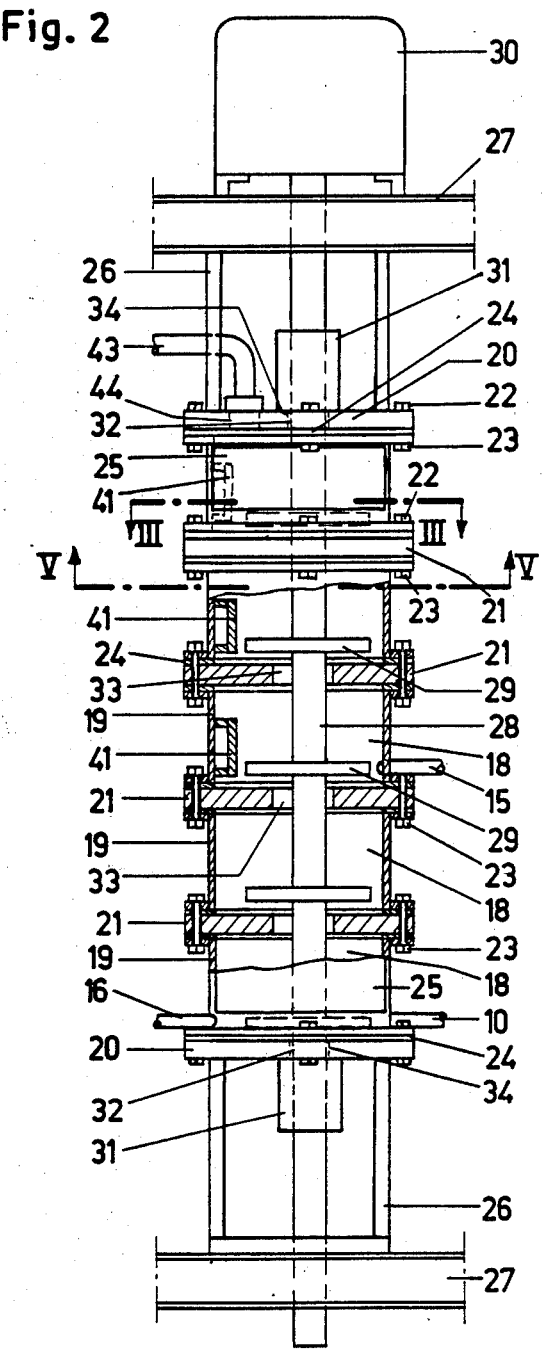
FIG. 2 shows a front view with parts cut-away, from the reactor in the plant shown in FIG. 1.
Figure 3:
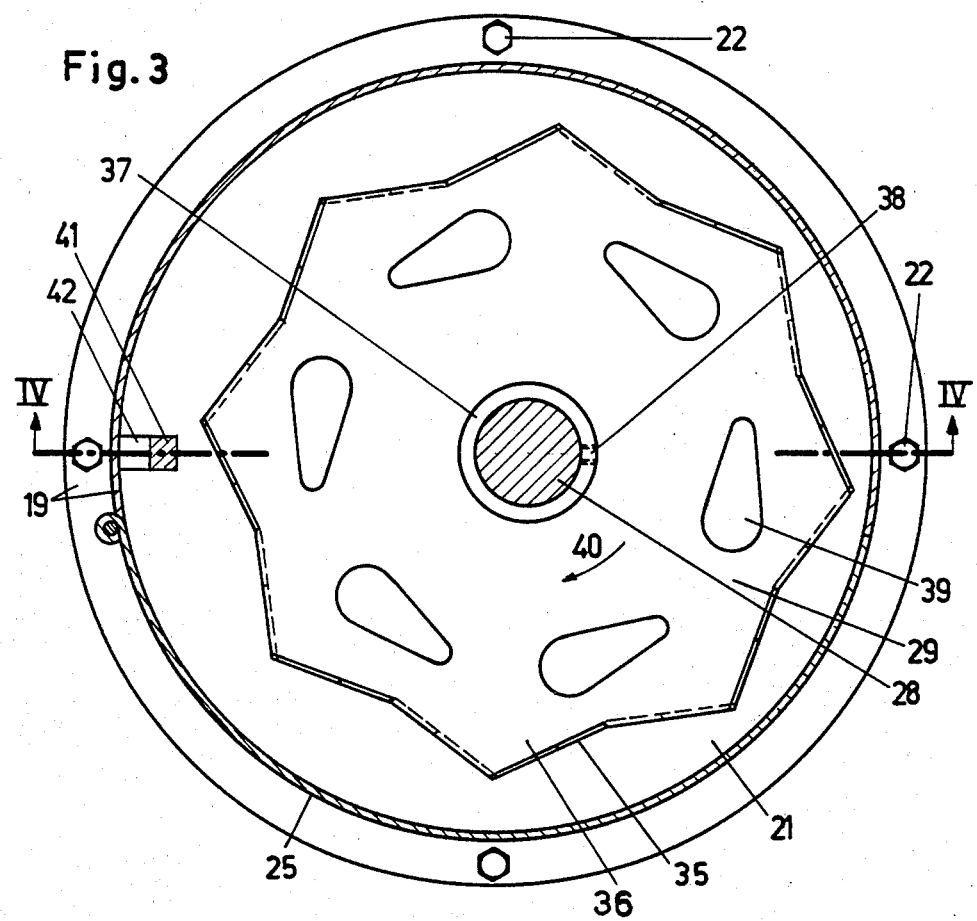
FIG. 3 shows a cross-section along line III—III in FIG. 2, on a larger scale.
Figure 4:
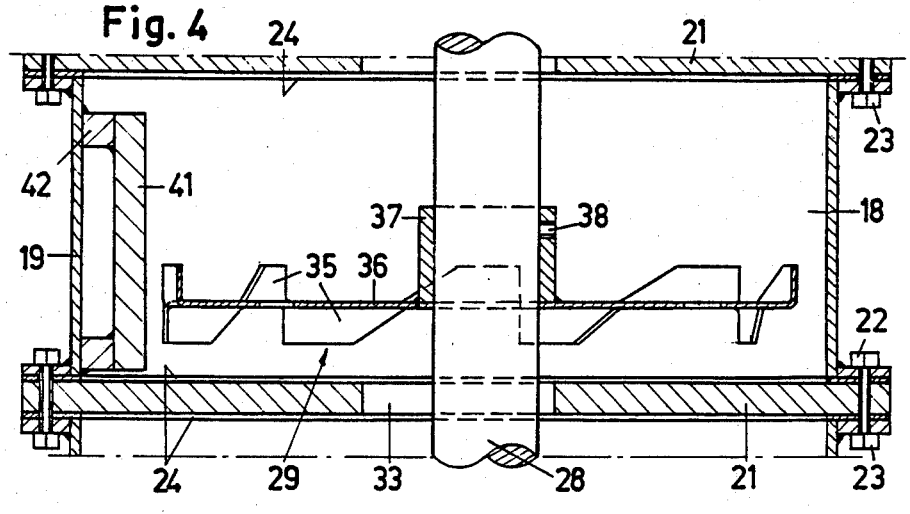
FIG. 4 shows a cross-section along line IV—IV in FIG. 3.
Figure 5:
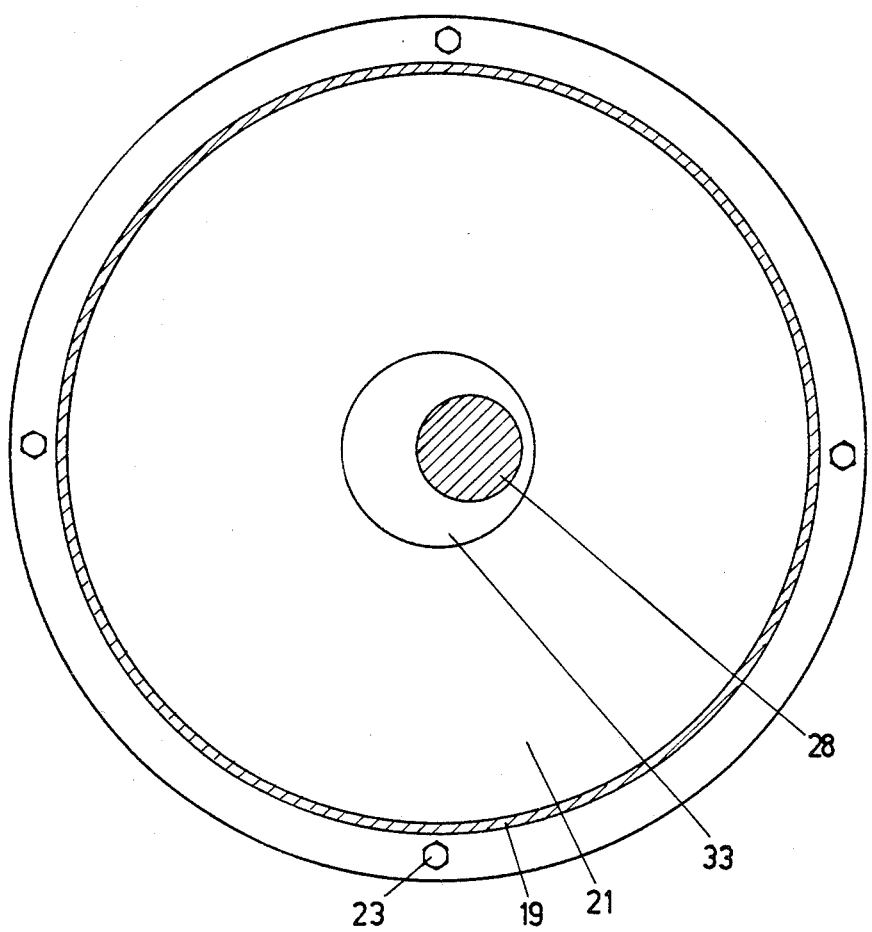
FIG. 5 shows a cross-section along line V—V in FIG. 2, on the same scale as FIGS. 3 and 4.

Said stirring discs 29 which have been shown but diagrammatically in FIG. 2, but are shown with detail in FIGS. 3 and 4, are from a type known per se and are formed by a substantially round disc which is so toothshaped cut out on the periphery thereof that sixteen teeth 35 are formed, said teeth being alternately bent over 90° to the one and the other side. Each stirring disc 29 is thus comprised of sixteen teeth 35, a flat portion 36 which is bounded by a sixteen-angled polygon, and a hub 37 which surrounds an opening in the center of said flat portion 36. The hub 37 is clamped by means of a screw 38 on shaft 28. In said flat portion 36 are further provided six oblong openings 39 the lengthwise direction of which is concentric with the flat portion 36 and which diverge in the normal rotation direction of the stirring disc, as shown in FIG. 3 by the arrow 40. The bases with which the various teeth 35 connect to the flat portion 36, are not directed tangentially but run along the rotation direction shown by arrow 40, more away from the center of the stirring disc for the upwardly-directed teeth 35, and more towards said center for the downwardly-directed teeth 35. That side lying frontwards in the rotation direction as shown by arrow 40, of the upwardly-directed teeth 35 lies at right angle to the flat portion 36, while the backmost edge in the rotation direction runs slantingly upwards. For the downwardly-directed teeth 35, that edge lying frontwards in the rotation direction as shown by arrow 40, runs slantingly to the front up to said flat portion 36, while that edge lying opposite thereto at the back of said teeth 35 is directed at right angle to the flat portion 36. The height of said teeth 35 is substantially equal to 15 mm. The spacing between the flat portion 36 from a stirring disc 29, and the lowermost wall 20 or 21 from that cell 18 the stirring disc is arranged in, is substantially equal to 1/10 the inner diameter of cell 18 and namely equal to 25 mm.

The line 10 through which the primary starch fraction is fed from storage tank 3 to reactor 1, connects to the lowermost cell 18 of said reactor 1, precisely level with the flat portion 36 from the lowermost stirring disc 29. Diametrically opposite the mouth of said line 10 and also level with the flat portion 36 from the lowermost stirring disc 29, the feed line 16 for caustic soda also connects to said lowermost cell 18. Said caustic soda forms a gelatinizing product which gelatinizes the primary starch fraction to form the carrier. The caustic soda and the primary starch fraction are further mixed inside the second cell 18 are reckoned from the bottom.

The line 15 through which the secondary starch fraction is fed from the mixing vat 4 to reactor 1, connects to the third cell 18 as reckoned from the bottom, also precisely opposite the flat portion 36 from that stirring disc 29 lying inside said cell. Inside said cell 18, the secondary starch fraction is mixed with the carrier and such mixing goes on in the fourth and fifth cells 18. Inside said latter three cells there thus occurs the actual glue preparation. It is of importance that in said cell 18 the secondary starch fraction is fed to, and in both cells 18 arranged thereabove, one baffle-plate 41 is also arranged. Said baffle-plate 41 lies opposite the shaft 28 of the stirrer with respect to the reactor axis. Said baffle-plate 41 is a reactangular metal plate which is made fast by means of distance parts 42, to the inner wall of cell 18, in such a way that said baffle-plate is directed vertically, lies with the outermost lengthwise edge thereof 10 mm away from the inner wall of that tube piece 19 which bounds said cell 18, and lies with the lowermost end thereof 5 mm away from the lowermost partition 21 which bounds said cell 18. The baffle-plates 41 insure an additional mixing and cause the mass present inside said cells to slide back to the stirring discs.

The starch glue thus obtained inside the uppermost cell 18 finally leaves the reactor through a discharge line 43 which communicates through an opening 44 in the uppermost wall 20, with the cell.

Due to the above-described unique structure characteristics of reactor 1, it is possible with but one reactor and but one stirring speed, both to gelatinize the primary starch fraction to form the carrier and to mix said carrier with the secondary starch fraction to form the glue or paste.

Reactor 1 is very compact so that should a failure occur, the losses will be minimized. Very rapidly after setting the plant into operation, there is already obtained a glue with a good viscosity and stability, and this with a relatively large output. The viscosity variations of the glue remain within allowable limits.

Due to the small passage openings between the various cells 18, flowing-back of the mass present inside such cells is prevented. This avoids notably that the secondary starch fraction reaches one of both lowermost cells 18, which would cause an additional gelatinization and would influence negatively the glue quality.

Mostly due to the off center arrangement of shaft 28 from stirrer 28, 29 and the presence of the baffle-plates 41, a very good mixing is obtained between the secondary starch fraction and the carrier, in spite of relatively low stirring speed. Said stirring speed is but 1500 r.p.m. which is very suitable for preparing the carrier but which, were said unique structure not provided, would not be high enough to obtain a good mixing of the secondary starch fraction with the carrier.

Due to the arrangement of shaft 28 off center of the reactor, the mass is subjected in various locations inside each cell, to forces of various magnitudes and mechanical friction forces appear at the level of the partitions 21 between the cells 18. There is however no sensible temperature increase whereby no negative influence is exerted on the secondary starch fraction.

The result is a very good and stable glue or paste with Bauer's viscosity between 20 and 180 sec at 28° C., Brookfield's viscosity between 200 and 1500 mPa.s for native starch and from 400 to 3000 mPa.s for modified starch.

The invention is in no way limited to the above-described form of embodiment and within the scope of the patent application, many changes may be brought to the described embodiment, notably as regards the shape, the arrangement, the composition and the number of the components which are used to embody the invention.

For instance, the preparing of the primary and secondary starch fractions does not have necessarily to occur in the above-described way. Both fractions may for example be prepared in sequence in one and the same mixing vat and after such preparing, be stored in storage tanks which then communicate with the reactor.

The number of cells in the reactor does not have necessarily to be five. Said number may also be larger, mostly when higher outputs are desired, and also smaller but it must be at least two.

The stirring discs do not have either to be in the above-described shape, but the shape thereof should however be so selected as to cause a good mixing.

The passage openings through which the cells communicate together do not have necessarily to be centered relative to the geometrical axis of the reactor. Said openings may quite well be centered relative to the stirrer axis.

It is also not required that the primary starch fraction and the gelatinizing product be fed to the reactor at the bottom thereof, while the prepared glue is discharged at the top. The reverse arrangement is also possible. The reactor does not have moreover to be necessarily arranged vertically. Said reactor may also extend slantingly or even horizontally.

We claim:

1. A reactor for continuously preparing a two-component starch glue, said reactor having a geometrical axis and comprising:
   a. a plurality of cells adjacent in the direction of said geometrical axis, said cells forming,
      a first end cell at one end of said axis,
      a second end cell at the other end of said axis and
      intermediate cells between said first end cell and said second end cell,
      said cells having each a cylindrical inner wall
   b. partitions between adjacent cells, each partition being provided with a limited passage opening,
   c. an inlet for a primary starch fraction, said inlet opening into said first end cell,
   d. an inlet for an agent for gelatinizing said primary starch fraction, said inlet opening into said first end cell,
   e. an inlet for a secondary starch fraction, said inlet opening into one of said intermediate cells,
   f. an outlet for glue, which outlet connects to said second end cell,
   g. a stirrer comprising:
      a shaft rotatably mounted in the reactor and extending parallel to the reactor axis, through the passage opening in each of the partitions between the cells, said shaft having a geometrical axis lying at a distance from the reactor axis,
      in each cell a stirring disc mounted on said shaft, said disc having its center on the geometrical axis of the shaft and being provided with teeth on its circumference, and
      a drive mechanism connected to said shaft,
   h. means for providing a primary starch fraction, means for feeding the primary starch fraction to the inlet of subsection c, means for providing an agent for gelatinizing the primary starch fraction, means for feeding the agent for gelatinizing the primary starch fraction to the inlet of subsection d, means for providing a secondary starch fraction, and means for feeding the secondary starch fraction to the inlet of subsection e, and
   i. in the intermediate cell into which opens the inlet for the secondary fraction, a baffle-plate mounted on the inner wall of the cell, opposite to the stirrer shaft axis with respect to the geometrical axis of the reactor, said baffle-plate extending in parallel relationship with said geometrical axis of the reactor, the first end cell into which opens the inlet for a primary starch fraction and cells, if any, between the first end cell and the intermediate cell into which opens the inlet for the secondary starch fraction being free of baffle-plates on their inner wall.

2. The reactor of claim 1, in which not only the cell into which the inlet for a secondary starch fraction opens but also the second end cell and cells, if any, lying between the last two mentioned cells are provided with a baffle-plate mounted on their inner wall, opposite to the stirrer shaft axis with respect to the geometrical axis of the reactor, said baffle-plate extending in parallel relationship with said geometrical axis of the reactor.

3. The reactor of claim 1, in which the inlet for the primary starch fraction and the inlet for the agent for gelatinizing the primary starch fraction open into the first end cell at the level of the stirring disc mounted in said cell and the inlet for the secondary starch fraction opens into said one of said intermediate cells at the level of the stirring disc mounted in this cell.

4. The reactor of claim 1, having a glue output of 4500 liters per hour at the most and in which said passage opening has a size of 100 cm$^2$ at the most.

5. The reactor of claim 1, in which the shaft has a geometrical axis lying at a distance from the geometrical axis of the reactor which is substantially equal to 1/25 the inner diameter of the cells.

6. The reactor of claim 5, in which the passage openings are centered relative to said geometrical axis of the reactor and define together with the shaft an annular space the greatest width of which is 25 mm.

7. The reactor of claim 1, in which a theoretical circle circumscribing the stirring disc in each cell has an outer diameter which is substantially 22/26 times the cell inner diameter.

* * * * *